Jan. 22, 1952  J. A. RIORDAN  2,583,392
TOOL FOR SPREADING SPLIT ENDS OF CONNECTING RODS
Filed Sept. 27, 1948
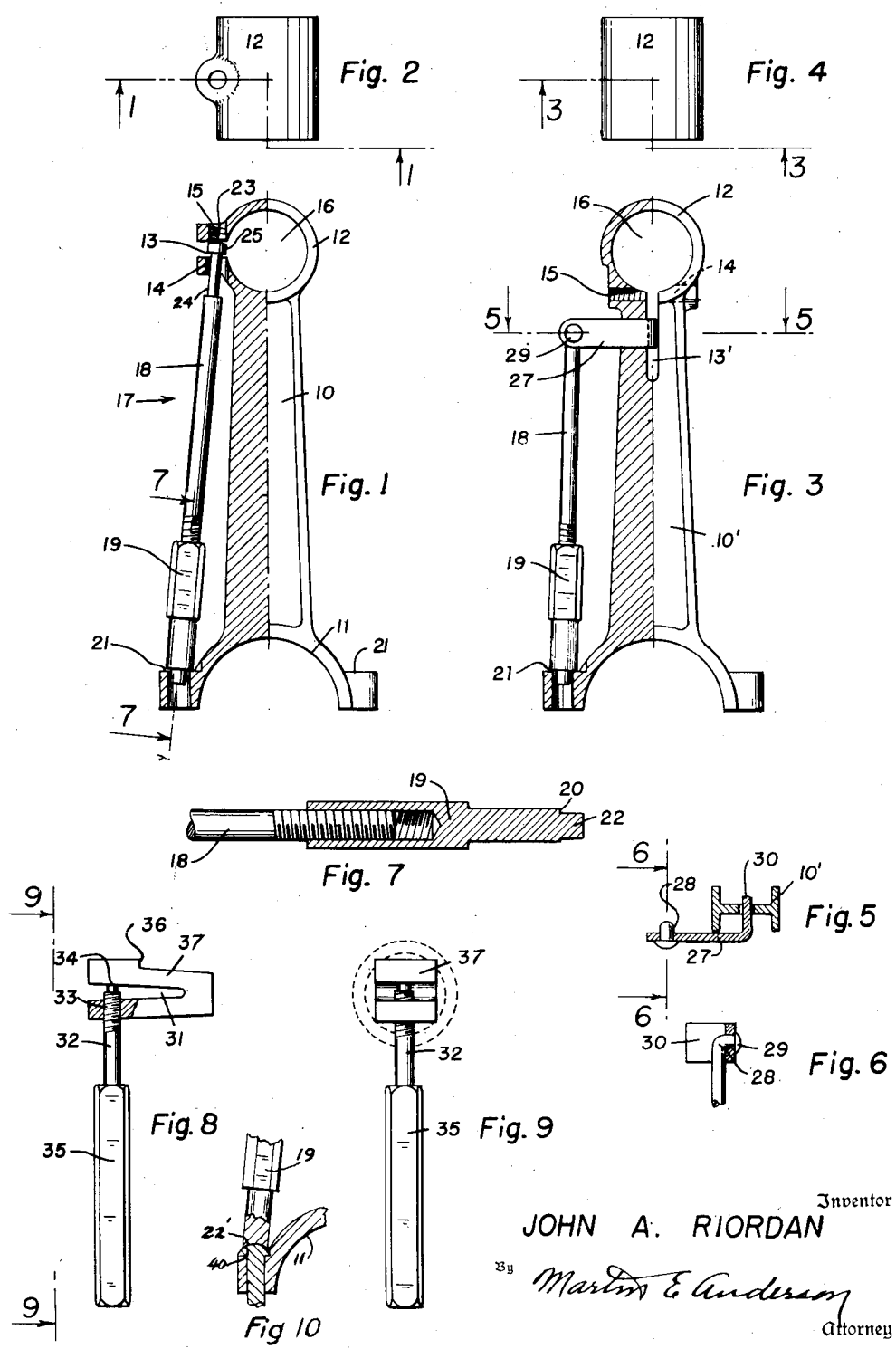
Inventor
JOHN A. RIORDAN
By Martin E. Anderson
Attorney Patented Jan. 22, 1952

2,583,392

UNITED STATES PATENT OFFICE 2,583,392

TOOL FOR SPREADING SPLIT ENDS OF CONNECTING RODS

John A. Riordan, Denver, Colo., assignor to James T. Clark, Fort Morgan, Colo.

Application September 27, 1948, Serial No. 51,448

3 Claims. (Cl. 254—100)

This invention relates to tools for engine mechanics and more particularly to tools for spreading the split piston pin ends of connecting rods.

In the assembly or disassembly of certain types of connecting rods to or from their pistons, the piston pin which connects the two members is usually held tightly by an end of the connecting rod necessitating driving, or otherwise forcing, the pin through the connecting rod to effect its removal or assembly relative thereto.

The principal object of this invention is to provide a tool which will spread the split ends of connecting rods of this class to thus facilitate engine assembly or disassembly.

Another object is to provide a tool which may be employed in cramped quarters within the engine.

Another object is to provide a tool which is equally useful where assembly or disassembly is effectuated with the connecting rod and piston removed from the engine.

Another object is to provide an extremely simple tool, having few parts, and which may be manufactured inexpensively.

Further objects, advantages, and salient features will become more apparent from the description to follow, the appended claims, and the accompanying drawing in which:

Figure 1 is a side elevation, partly in section, of one type of connecting rod and one form of tool in operative position thereon, taken on line 1—1, Figure 2;

Figure 2 is a top plan view of the piston pin end of the connecting rod shown in Figure 1;

Figure 3 is a side elevation, partly in section, of another type of connecting rod and another form of tool in operative position thereon, taken on line 3—3, Figure 4;

Figure 4 is a top plan view of the piston end of the connecting rod shown in Figure 3;

Figure 5 is a section taken on line 5—5, Figure 3;

Figure 6 is a section taken on line 6—6, Figure 5;

Figure 7 is a section taken on line 7—7, Figure 1;

Figure 8 is a side elevation, partly in section, of a tool which may be employed with the tools shown in Figures 1 and 2;

Figure 9 is an end elevation of the tool shown in Figure 8, taken on line 9—9, thereof; and Figure 10 is a fragmentary side elevation, partly in section, of a modified form of jack screw.

Referring in detail to the drawing, there is shown in Figure 1, a conventional connecting rod 10, the cap thereof being omitted, this rod having a journal end 11 which receives the crank pin bearing, and a small end 12 which receives a piston or wrist pin therein, the latter having its ends journaled in piston pin bosses of the piston, all as well understood in the art. The small end 12 has a slot 13, and a hole 14 for receiving a clamp bolt (not shown) which has one end thereof engageable with threads 15. When the piston and connecting rod are assembled, the clamp bolt draws end 12 tightly about the wrist pin, thus securing the parts together. Usually, the wrist pin is provided with a slot in one side thereof through which the clamp bolt passes to preclude end motion between the wrist pin and connecting rod, all as also well known in the art.

The bore 16 of end 12 is usually slightly smaller than the wrist pin so that the wrist pin will fit therein with a force or drive fit and it is customary practice when assembling the wrist pin to the connecting rod to either press, or drive, with a hammer and suitable punch, the wrist pin through the bore. This is a cumbersome procedure and not fully satisfactory because the slot in the wrist pin must be parallel with opening 14 and in event the wrist pin is inserted misaligned it is difficult to rotate it in bore 16. It is not uncommon, also, where misalignment occurs, to withdraw the wrist pin and repeat the procedure several times until the wrist pin is properly aligned to receive the clamp bolt within its slot, all of which causes unnecessary disconcertment to the mechanic.

This cumbersome procedure is eliminated by tool 17 which comprises a rod 18 having a jack screw 19 threaded on one end thereof, the latter having an abutment 20 which engages a surface 21 of the connecting rod, which, as illustrated, is the surface against which one of the heads of the connecting rod bolts normally engage.

Jack screw 19 also has an end 22 which enters one of the connecting rod bolt holes to prevent the jack screw from slipping sidewise. The opposite end of the rod 18, as shown in Figure 1, has means 23, in the form of an abutment, which is adapted to press against the upper portion of the end 12 above slot 13, so that rotation of jack screw 19 widens slot 13, thus permitting easy insertion or withdrawal of the wrist pin by mere manipulation with the fingers of the hand. The upper end may be relieved with a groove 24, if desired, so that end 25 may be made approximately the same size as hole 14, yet permit the tool to assume the angular position as shown without binding.

In Figure 3 is shown another form of connecting rod which is essentially the same as that shown in Figure 1 except that slot 13' is disposed longitudinally of end 12 rather than transverse thereof and clamp bolt hole 14 is transverse rather than longitudinal of the connecting rod. The tool employed to widen slot 13' has a rod 18 and jack screw 19, as in Figure 1, but the upper end of rod 18 carries a lever 27 pivotally secured thereto at one end by a bent portion 28 riveted at 29. The other end of lever 27 has a bent portion 30 which is received within slot 13'. When rod 18 is raised by jack screw 19, lever 27 is rotated and the end 30 cams the slot to a wider opening, thus increasing the diameter of bore 16.

This embodiment of the invention is disclosed and claimed in my copending application, Serial No. 260,478 filed December 7, 1951 which is a division of this application.

Figures 8 and 9 illustrate a tool which may be used in conjunction with the tools previously described. A square block 37 is provided having a slot 31 extending the major portion of its length, this block being spread apart by a screw 32 which is threaded at 33 and abuts the block at 34. The size of the square, diagonally, is approximately the size of the inside bore of the wrist pin and when inserted therein screw 32 is rotated by handle 35 and the block expanded to engage the inside wall of the wrist pin. This tool is especially useful on certain automobile engines where the pistons may not be removed therefrom by lowering them through the cylinder bores to expose the wrist. When it is desired to replace a connecting rod in an engine of this type, the connecting rod is disconnected from the crank pin, the piston lowered to the end of the cylinder bore to expose the wrist pin, the tool of Figures 1 or 3 applied thereto after moving the wrist pin lock bolt, and then the tool of Figure 8 is inserted in one end of the wrist pin. The wrist pin is then easily slid endwise and removed, and the procedure, of course, reversed when installing the new connecting rod. This procedure obviates the removal of the cylinder head of the engine which would normally be necessary in engines where the pistons may be removed only through the cylinder head ends of the cylinder bores. An abutment 36 may be employed on the tool of Figures 8 and 9, if desired, to limit the depth of entry of the block 37 within the wrist pin. This tool is disclosed and claimed in my copending application, Serial No. 144,096, filed February 14, 1950, which latter is a division and a continuation-in-part of this application.

The wrist pin holding tool just described is especially useful in a "fishing" job in cramped quarters; but it is of course, also useful where assembly or disassembly is effected with the piston and connecting rod removed from the engine, that is, in bench assembly. As previously explained, it is always necessary to align the slot in the wrist pin with the hole 14 and with the pin secured to and under control of handle 35, the wrist pin may be longitudinally moved or rotated with respect to the connecting rod to facilitate entry of the split end locking screw within the wrist pin locking slot.

In certain types of connecting rods the connecting rod bolts have rounded heads which form a convenient abutment for the lower end of the jack screw 19. In Figure 10 is shown a slightly modified form of jack screw having a concave end 22' which engages rounded head 40 of a connecting rod bolt. This concave end 22' serves the same purpose as end 22 shown in Figure 7, that is, prevents lateral slippage of the jack screw. It is apparent, therefore, that the lower end of the jack screw need not necessarily engage the connecting rod proper, but may also engage any member associated therewith which will prevent slippage of the jack screw. The word "connecting rod," as used in the claims, is therefore to be construed to mean the connecting rod proper or any abutment member associated therewith with which the jack screw may engage, within the spirit of the invention.

Having described the invention what is claimed as new is:

1. A tool for spreading a split wrist pin accommodating boss at the outer end of a connecting rod to enable a wrist pin readily to be removed from or to be inserted into said boss, said tool comprising a member to be engaged at its outer end with a portion of said boss and operable by outward movement thereof to exert a spreading force upon said boss, and a screw element reactable directly from an inner end portion of said rod directly against said member to move said member outwardly.

2. A tool for spreading a split wrist pin accommodating boss at the outer end of a connecting rod to enable a wrist pin readily to be removed from or to be inserted into said boss, said tool comprising a pair of members one to be engaged directly with an inner end portion of the connecting rod and to be held solely by its engagement therewith against inward movement relative to said rod and the other to be engaged with a part of said boss and to be moved outwardly to impart an outwardly spreading force upon said boss, and a screw element for reaction directly from said first-mentioned member directly upon said second-mentioned member to move said second-mentioned member outwardly.

3. A tool for spreading a split wrist pin accommodating boss at the outer end of a connecting rod to enable a wrist pin readily to be removed from or to be inserted into said boss, said tool comprising a member to be engaged with said boss to exert an outwardly directed spreading force thereon, a second member to be engaged directly with an inner end portion of the connecting rod and to be held solely by its engagement with the latter against inward movement relative to said rod, and a screw element having threaded engagement with one of said members and engageable directly with the other of said members and operable by threading movement along the member with which it has threaded engagement to exert an outwardly directed boss-spreading force upon said first-mentioned member.

JOHN A. RIORDAN.

REFERENCES CITED

The following references are of record in the file of this patent:

UNITED STATES PATENTS

| Number | Name | Date |
| --- | --- | --- |
| 1,462,447 | Dutro et al. | July 17, 1923 |
| 2,331,683 | Hendricks | Oct. 12, 1943 |
| 2,387,430 | Daubs | Oct. 23, 1945 |